UNITED STATES PATENT OFFICE.

EDGAR W. SNYDER, OF LOS ANGELES, CALIFORNIA, ASSIGNOR, BY MESNE ASSIGNMENTS, TO OCOTILLO PRODUCTS COMPANY, A CORPORATION OF DELAWARE.

FLEXIBLE FLOOR-COVERING.

1,262,990.   Specification of Letters Patent.   Patented Apr. 16, 1918.

No Drawing.   Application filed August 9, 1917.   Serial No. 185,348.

*To all whom it may concern:*

Be it known that I, EDGAR W. SNYDER, a citizen of the United States, residing at Los Angeles, in the county of Los Angeles and State of California, have invented certain new and useful Improvements in Flexible Floor-Coverings, of which the following is a specification.

This invention relates to flexible floor coverings such as linoleum, composition tiling and the like, and has particular reference to a material of this character comprising as an ingredient thereof ocotillo gum.

The ocotillo plant (*Fouquiera splendens*) is a small tree which grows in considerable abundance in Northern Mexico, along the Rio Grande and elsewhere. The bark of this plant or tree contains approximately from 20 to 25% of gum which may be obtained by the use of suitable solvents, such as gasolene, benzin, alcohol, ether and the like, preferably in the presence of from 1 to 3 per cent. by weight of lime or magnesia, from which solvents the gum is subsequently separated, by evaporation or distillation.

As obtained from the bark the ocotillo gum is in the form of a soft plastic mass having marked adhesive and cementing or binding properties.

In the manufacture of linoleum, composition tile and the like, in accordance with my invention, I incorporate with the gum linseed oil and a suitable base or inert filler such as ground slate, cork, and similar ingredients now employed in the manufacture of such materials. I may employ "blown" or oxidized linseed oil or boiled linseed oil, the latter being preferably employed in the manufacture of the better grades of linoleum, tiling and the like.

The ingredients of my composition may be mixed in widely varying proportions. I have found however that satisfactory results may be obtained by mixing the ocotillo gum, linseed oil and the base in the proportions of one part by weight of the gum to one part by weight of the oil, the mixture having incorporated therewith sufficient of the mineral or other base to produce a satisfactory product of the desired degree of hardness. The proportion in which the mineral or other base is added is well understood by those skilled in the art.

I may employ several times as much gum as oil or I may employ several times as much oil as gum and produce a satisfactory product, the proportions in which these ingredients are mixed being determined by the character of the material sought to be produced.

The manufacture or fabrication of linoleum, composition tile, or the like, is practised in accordance with the customary methods now in use in this industry and well understood by those skilled therein.

It is to be understood that other ingredients than those above specified, which are now employed in the manufacture of linoleum, composition tile and the like, may be used in producing my improved product without departing from the spirit of my invention or the scope of the appended claims.

Having thus described my invention, I claim:

1. A composition for forming a flexible floor covering, comprising a finely divided inert filler, and ocotillo gum mixed therewith to form a substantially homogeneous mass.

2. A flexible floor covering comprising ocotillo gum, linseed oil, and an inert filler.

In testimony whereof I affix my signature.

EDGAR W. SNYDER.